United States Patent [19]
Ohba

[11] Patent Number: 5,433,660
[45] Date of Patent: Jul. 18, 1995

[54] AUTOMATIC VEHICULAR VENTILATING SYSTEM

[76] Inventor: Shunji Ohba, 2667-5, Funaki, Shimada-shi, Shizuoka, Japan

[21] Appl. No.: 129,395

[22] Filed: Sep. 30, 1993

[30] Foreign Application Priority Data

Dec. 14, 1992 [JP] Japan .................................. 4-352853

[51] Int. Cl.$^6$ .............................................. B60H 1/26
[52] U.S. Cl. ...................................... 454/75; 454/141; 454/900
[58] Field of Search ...................... 454/75, 76, 78, 105, 454/141, 900

[56] References Cited

U.S. PATENT DOCUMENTS

| | | |
|---|---|---|
| 1,550,503 | 8/1925 | Coffman . |
| 1,846,552 | 2/1932 | Haskins . |
| 3,392,654 | 7/1968 | Grenier ................................ 454/75 |
| 4,741,256 | 5/1988 | Huang . |
| 4,804,140 | 2/1989 | Cantrell .......................... 454/141 X |
| 5,205,782 | 4/1993 | Ohba ................................ 454/141 |

FOREIGN PATENT DOCUMENTS 114108 7/1984 Japan .................................. 454/900

Primary Examiner—Harold Joyce
Attorney, Agent, or Firm—Finnegan, Henderson, Farabow, Garrett & Dunner

[57] ABSTRACT

An automatic vehicular ventilating system ventilates the passenger room of a vehicle such as automobiles, aircraft, railway passenger cars and ships to maintain air in the passenger room at a fixed temperature automatically. The automatic vehicular ventilating system includes a solar power supply unit having a solar panel as a power supply, a first switch responsive to the output of a thermostat, and a second switch in communication with at least at least one of an ignition switch of the vehicle and a hand brake of the vehicle; an exhaust unit having an air exhaust damper; and a fresh air supply unit having an air supply damper. The air exhaust damper and the air supply damper are driven by electric power supplied from the solar power supply unit.

6 Claims, 6 Drawing Sheets

AUTOMATIC VEHICULAR VENTILATING SYSTEM

BACKGROUND OF THE INVENTION

1. Field of the Invention

The present invention relates to an automatic vehicular ventilating system capable of maintaining the temperature of the passenger room of all kinds of vehicles including automobiles, such as passenger cars and trucks, railway passenger cars, aircraft and ships in a specified temperature range without adversely affecting the air-conditioning effect of the associated air-conditioning system.

2. Description of the Prior Art

The passenger room of a vehicle is ventilated naturally through the side windows or the roof window or forcibly by the air-conditioning system. However, such natural ventilation needs some one to open the side windows or the roof window and it may be inappropriate to open the side windows or the roof window on a rainy day. Forced ventilation using the air-conditioning system will reduce power available for driving the vehicle for running, and the operation of the air-conditioning system for an extended period of time will increase the fuel consumption of the engine. The conventional automobile is not provided with any ventilating system capable of automatically ventilating the passenger room while the same is parked and, consequently, the temperature of the passenger room rises to a very high temperature in the range of 60° C. to 70° C. if the automobile is parked with the windows closed under a burning sun in the middle of summer. An infant will be dehydrated to death if the infant is confined in such a hot passenger room for along time. Likewise, the magnetic tapes of tape cassettes will be ruined and the frames of glasses will be deformed if such objects are kept in such a hot passenger room. Nevertheless, any effective means for obviating such troubles has not been proposed.

SUMMARY OF THE INVENTION

Accordingly, it is an object of the present invention to provide an automatic vehicular ventilating system applicable to all kinds of vehicles including automobiles, railway passenger cars, airplanes and ships that have a passenger room, and capable of automatically ventilating the passenger room so that the temperature of the passenger room will not rise excessively and the passenger room will not be uncomfortable to stay therein Another object of the present invention is to provide an automatic vehicular ventilating system capable of operating without excessively using the energy of the battery of the associated vehicle.

An automatic vehicular ventilating system for automatically ventilating the passenger room of a vehicle, in a first aspect of the present invention, comprises: a solar power supply unit including a solar panel as a power supply installed at an appropriate position on the outer surface of the body of the vehicle, a thermostat for measuring changes in the temperature of the passenger room, a first switch controlled by the thermostat, and a second switch interlocked with the engine switch or the hand brake of the vehicle; an air exhaust unit including an air exhaust damper means and an air exhaust means; and a fresh air supply unit including an air supply damper means and an air supply means.

The air exhaust unit and the fresh air supply unit are powered by the solar panel of the solar power supply unit.

The automatic vehicular ventilating system may further comprise: a battery power supply unit having a third switch interlocked with the engine switch or the hand brake of the vehicle, and connected to the battery of the vehicle; first solenoid actuators respectively for opening the air exhaust damper means and the air supply damper means; springs respectively biasing the air exhaust damper means and the air supply damper means toward the closed position; second solenoid actuators respectively for closing the air exhaust damper means and the air supply damper means, and linkages respectively interlocking the air exhaust damper means and the air supply damper means with plungers of the corresponding first solenoid actuators and the corresponding spring.

The air exhaust means, the air supply means and the first solenoid actuators are powered by the solar panel of the solar power supply unit, and the second solenoids are powered by the battery of the vehicle connected to the battery power supply unit.

An automatic vehicular ventilating system for ventilating the passenger room of a vehicle, in a second aspect of the present invention comprises: a solar power supply unit including a solar panel as a power supply installed at an appropriate position on the outer surface of the body of the vehicle, a thermostat for measuring the temperature of the passenger room, a first switch controlled by the thermostat, and a second switch interlocked with the engine switch or the hand brake of the vehicle; a battery power supply unit having a third switch interlocked with the engine switch or the hand brake of the vehicle; an air exhaust unit including an air exhaust damper means, an air exhaust means, a closing means for closing the air exhaust damper means, an opening means for biasing the air exhaust damper means toward the open position, and a linkage interlocking the air exhaust damper means with the closing means and the opening means; a fresh air supply unit including an air supply damper means, an air supply means, a closing means for closing the air supply damper means, an opening means for biasing the air supply damper means toward the open position, and a linkage interlocking the air supply damper means with the closing means and the opening means.

The air exhaust means and the fresh air supply means are powered by the solar panel of the solar power supply unit, and the first and second solenoid actuators are powered by the battery of the vehicle connected to the battery power supply unit.

Ducts provided with deflector plates may be connected to the air exhaust unit and the fresh air supply unit to prevent water from flowing through the automatic vehicular ventilating system into the passenger room on a rainy day or when washing the vehicle. An air exhaust duct and an air supply duct connected respectively to the air exhaust unit and the fresh air supply unit may be extended in the passenger room for the efficient ventilation of the passenger room.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENTS

Figure 1A:
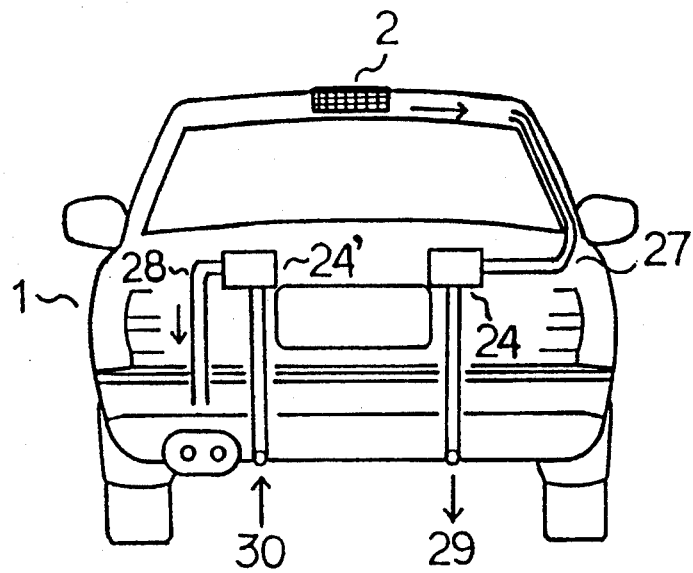
FIGS. 1A, 1B and 1C are a rear view and side views, respectively, showing the arrangement of the components of an automatic vehicular ventilating system in accordance with the present invention on an automobile.

An automatic vehicular ventilating system in a first embodiment according to the present invention shown in FIGS. 1 to 4 will be described hereinafter as applied to an automobile.

An automatic vehicular ventilating system in a first embodiment according to the present invention comprises a solar power supply unit 6, a battery power supply unit 9, an air exhaust unit 24, and a fresh air supply unit 24'.

Referring to FIGS. 1 to 4, the solar power supply unit 6 comprises a solar panel 2 disposed at an appropriate position on the outer surface of the body of an automobile 1, a thermostat 3 for measuring the temperature of air in the passenger room, a first switch 4 controlled by the thermostat 3, and a second switch 5 interlocked with the engine switch, not shown, or the hand brake, not shown, of the automobile 1. In the following description, it is supposed that the second switch 5 is interlocked with the engine switch.

The battery power supply unit 9 comprises the battery 7 of the automobile, and a third switch 8 interlocked with the engine switch or the hand brake of the automobile so as to be closed when the engine switch is opened or the hand brake is applied. In the following description, it is supposed that the third switch 8 is interlocked with the engine switch.

The air exhaust unit 24 for discharging air from the passenger room of the automobile 1 comprises an air exhaust damper 10 through which air is discharged outside the passenger room, a first solenoid actuator 11 for opening the air exhaust damper 10, a spring 12 for biasing the air exhaust damper 10 toward the closed position, a linkage interlocking the air exhaust damper 10 with the first solenoid actuator 11 and the spring 12, an electromagnet 13 for holding the the air exhaust damper 10 at its closed position, and an air exhaust device 17 for discharging air outside from the passenger room.

The fresh air supply unit 24' comprises an air supply damper 10' through which fresh air is introduced into the passenger room, a first solenoid actuator 11 for opening the air supply damper 10', a spring 12 biasing the air supply damper 10' toward the closed position, a linkage interlocking the air supply damper 10' with the first solenoid actuator 11 and the spring 12, an electromagnet 13 for holding the air supply damper 10' at its closed position, and an air supply device 17'.

The air exhaust device 17 and the air supply device 17' are driven by electric energy generated by the solar panel 2 of the solar power supply unit 6, and the electromagnets 13 are energized by electric energy supplied from the battery power supply unit 9.

The solar panel 2 is put on the roof of the automobile 1 in this embodiment as shown in FIG. 1. The solar panel 2 may be disposed at any suitable place, such as on the trunk lid or on the engine hood of the automobile 1, provided that the solar panel 2 is satisfactorily exposed to the sunshine.

Although the air exhaust unit 24 and the fresh air supply unit 24' are disposed on the rear tray behind the back of the rear seat as shown in FIG. 1 in this embodiment, there is no particular restriction on the respective positions of the air exhaust unit 24 and the fresh air supply unit 24'.

The first switch 4 remains open while the temperature of the passenger room is below a specified temperature. The thermostat 3 closes the first switch 4 upon the rise of the temperature of the passenger room to the specified temperature. The second switch 5 is closed when the engine switch, not shown, is opened and opened when the engine switch is closed.

Figure 3:
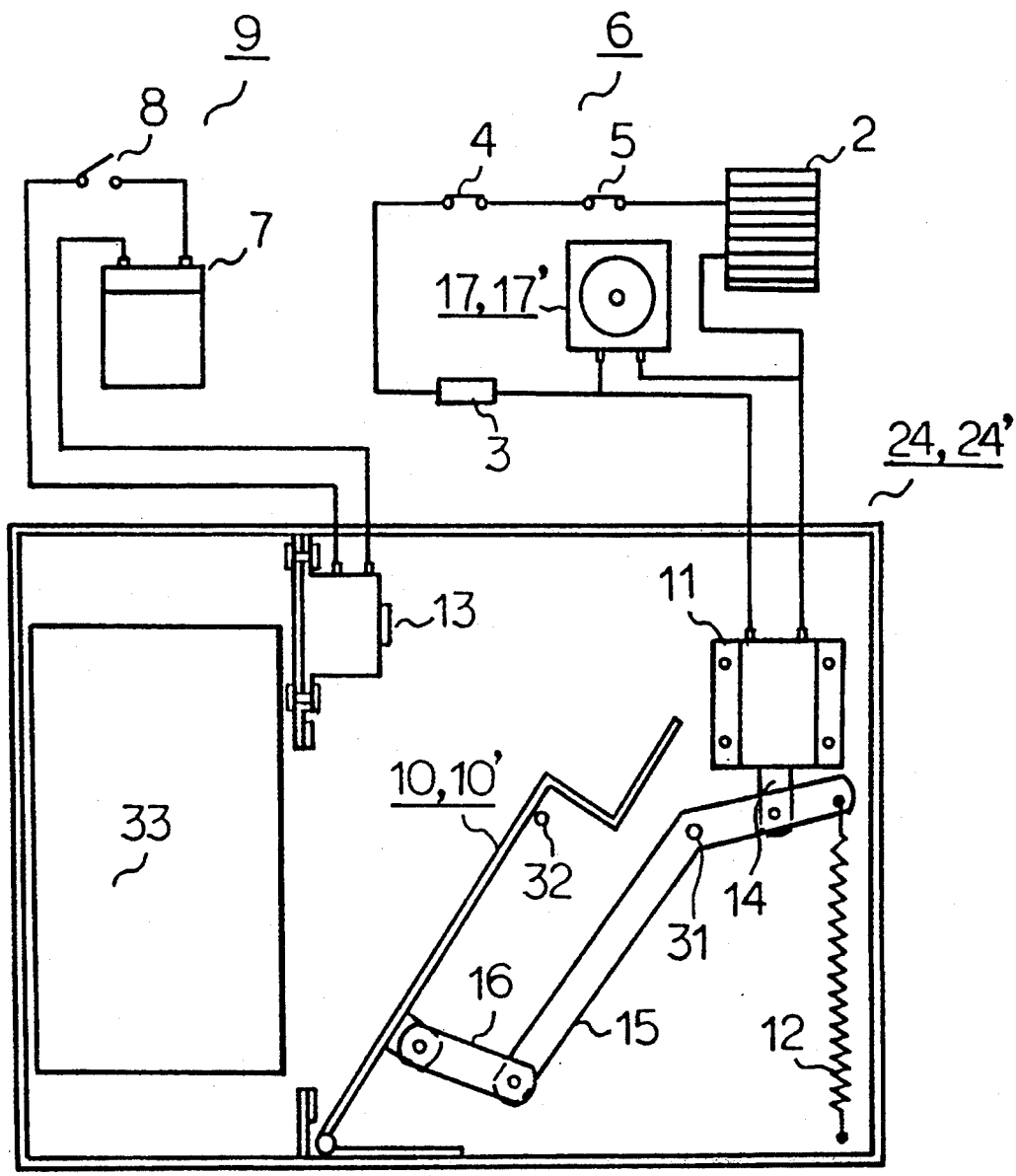
FIG. 3 is a diagrammatic view of an automatic vehicular ventilating system in a first embodiment according to the present invention provided with the air exhaust unit and the fresh air supply unit of FIG. 2, in which the air exhaust damper and the air supply damper are opened.

As is obvious from FIG. 3, electric energy is supplied to the first solenoid actuators 11, the air exhaust device 17 and the air supply device 17' from the solar panel 2 when both the first switch 4 and the second switch 5 are closed. The air exhaust device 17 and the air supply device 17' are miniature motor fans in this embodiment. The air exhaust unit 24 discharges air outside the passenger room in the direction of the arrow 29, while the fresh air supply unit 24' supplies fresh air into the passenger room in the direction of the arrow 30.

The air exhaust unit 24 comprising the air exhaust damper 10 and the air exhaust device 17, and the fresh air supply unit 24' comprising the air supply damper 10' and the air supply device 17' are substantially the same in construction, and hence only the air exhaust unit 24 will be described with reference to FIGS. 3 and 4, in which the reference characters denoting the corresponding components of the fresh air supply unit 24' are shown in parentheses.

Figure 4:
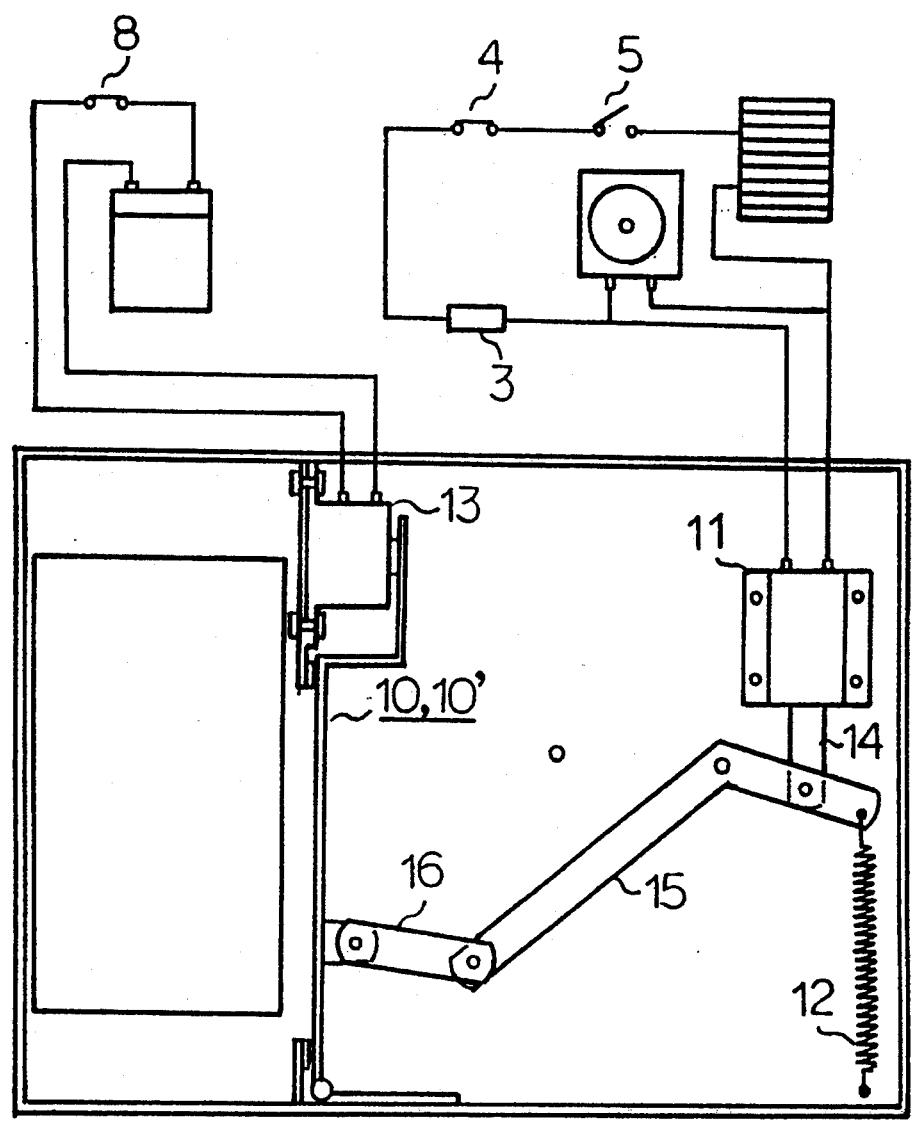
FIG. 4 is a diagrammatic view of the automatic vehicular ventilating system of FIG. 3, in which the air exhaust damper and the air supply damper are closed.

Referring to FIGS. 3 and 4, the air exhaust damper 10 (the air supply damper 10') has one end pivotally supported on the casing of the air exhaust unit 24 (the fresh air supply unit 24'), and is interlocked with the plunger 14 of the first solenoid 11 and the spring 12 by the linkage. The linkage comprises a first link 15 pivotally supported on a pin 31, and having a first arm pivotally joined to the extremity of the plunger 14 of the first solenoid 11, and a second link 16 having one end pivotally joined to the extremity of a second arm of the first link 15 and the other end pivotally joined to a bracket fixed to the air exhaust damper 10 (the air supply damper 10'). The spring 12 has one end connected to a spring peg fixed to the casing and the other end connected to the extremity of the first arm of the first link 15. When the first solenoid actuator 11 is not energized, the air exhaust damper 10 (the air supply damper 10') is held at its closed position by the spring 12 to close an outlet vent 33 (an inlet vent 33).

Upon the increase of the temperature of the passenger room measured by the thermostat 3 beyond a specified temperature while the automobile is parked with the second switch 5 closed and the third switch 8 open, the first switch 4 is closed automatically to connect the solar power supply unit 6 to the air exhaust unit 24 and the fresh air supply unit 24'. Then, the first solenoid actuators 11 are energized to open the outlet and inlet vents 33 by turning the exhaust damper 10 and the air supply damper 10' to a state shown in FIG. 3, and to start the air exhaust device 17 and the air supply device 17' for ventilation.

Upon the decrease of the temperature of the passenger room measured by the thermostat 3 below the specified temperature while the automatic vehicular ventilating system is in operation, the first switch 4 is opened automatically to disconnect the solar power supply unit 6 from the air exhaust unit 24 and the fresh air supply unit 24' and, consequently, the automatic vehicular ventilating system is stopped, in which the outlet and inlet vents 33 are closed to a state shown in FIG. 4.

Figure 2:
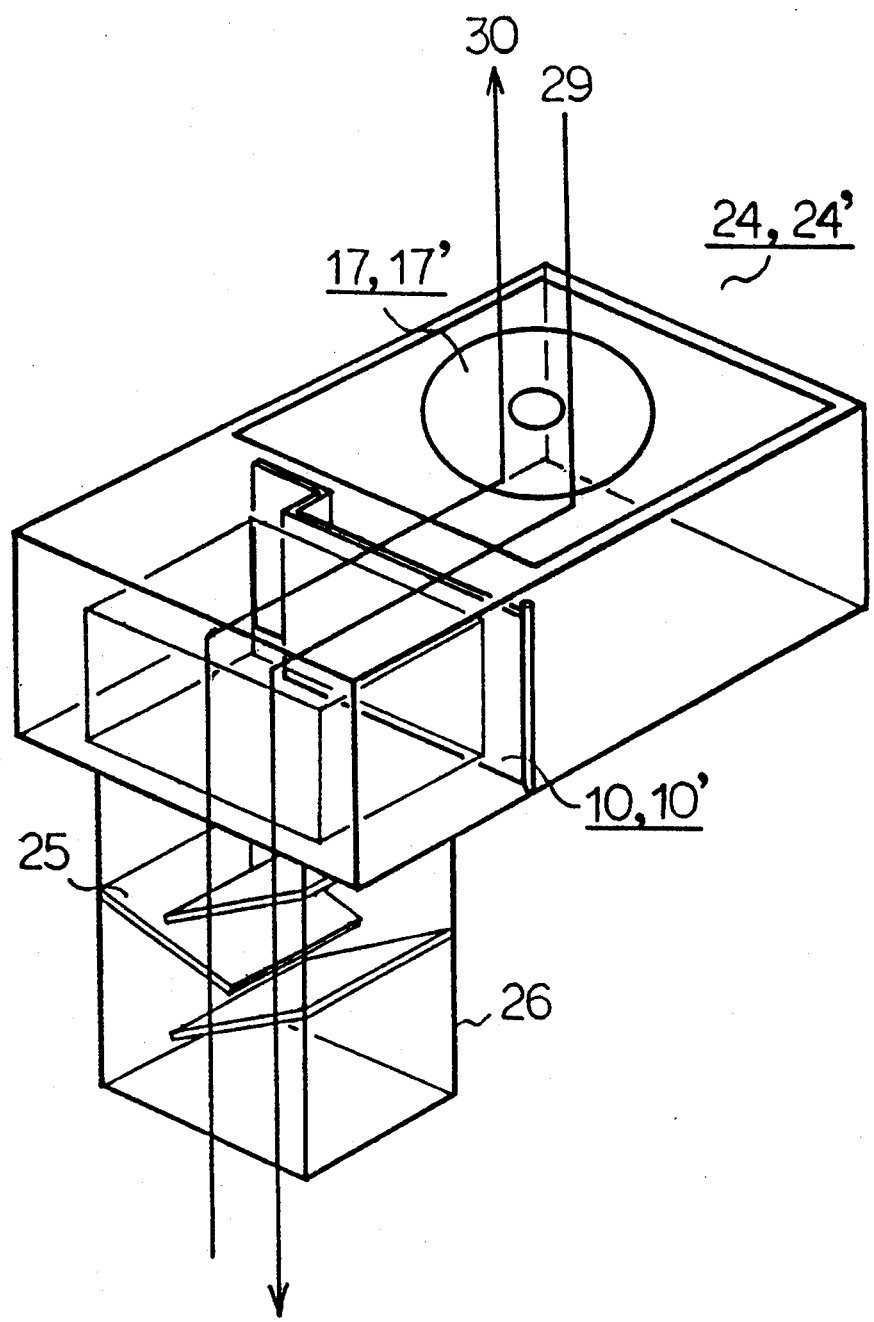
FIG. 2 is a schematic perspective view of an air exhaust unit (fresh air supply unit) employed in the present invention.

In operation, when the engine switch is opened, the second switch 5 is closed and the third switch 8 is opened to disconnect the battery power supply unit 9 from the electromagnets 13 to de-energize the latter. In this state, the magnetic attraction of the electromagnets 13 disappears and the air exhaust damper 10 and the air supply damper 10' are held at their closed positions by the springs 12. When the temperature of air in the passenger room measured by the thermostat 3 rises beyond the specified temperature, the first switch 4 is closed to supply power to the first solenoid actuators 11 from the solar power supply unit 6. Then, the plungers 14 of the first solenoid actuators 11 are retracted to turn the first link 15 counterclockwise to the position in FIG. 3, on the pin 31. Consequently, the air exhaust damper 10 and the air supply damper 10' are turned clockwise to the position shown in FIG. 3, until the same are stopped by stoppers 32 to open the outlet and inlet vents 33. At the same time, electric energy is supplied to the air exhaust device 17 and the air supply device 17' to start ventilation. Thus, the air exhaust unit 24 discharges air outside from the passenger chamber in the direction of the arrow 29 (FIG. 2) and the air supply unit supplies fresh air into the passenger chamber in the direction of the arrow 30 (FIG. 2). If the temperature of air in the passenger measured by the thermostat 3 drops below the specified temperature as a consequence of ventilation, the first switch 4 is opened automatically. Consequently, the air exhaust device 17 and the air supply device 17' are disconnected from the solar power supply 6, the first solenoid actuators 11 are de-energized, and the air exhaust damper 10 and the air supply damper 10' are turned counterclockwise to the position shown in FIG. 4 through the linkages by the springs 12 to close the outlet and inlet vents 33, respectively.

When the engine switch is closed while the automatic vehicular ventilating system is in operation, the second switch 5 is opened and the third switch 8 is closed. Consequently, the the solar power supply unit 6 is disconnected from the air exhaust device 17 and the air supply device 17', the first solenoid actuators 11 are de-energized, the air exhaust damper 10 and the air supply damper 10' are turned counterclockwise to the position shown in FIG. 4, through the linkages by the springs 12 to close the outlet and inlet vents 33. Likewise, and the electromagnets 13 are energized by electric energy supplied thereto from the battery 7 of the battery power supply unit 9 to hold the air exhaust damper 10 and the air supply damper 10' at their closed positions by magnetic attraction in a state shown in FIG. 4. The electric energy of the battery 7 consumed for continuously magnetizing the electromagnets 13 while the engine is in operation is compensated with electric energy generated by the generator of the automobile, so that the battery 7 will not be exhausted. Since the air exhaust damper 10 and the air supply damper 10' are held firmly at their closed position by the electromagnets 13 to seal the passenger room, the air-conditioning effect of the air conditioner is not reduced.

An automatic vehicular ventilating system in a second embodiment according to the present invention will be described hereinafter with reference to FIGS. 5 and 6 as applied to an automobile.

Figure 5:
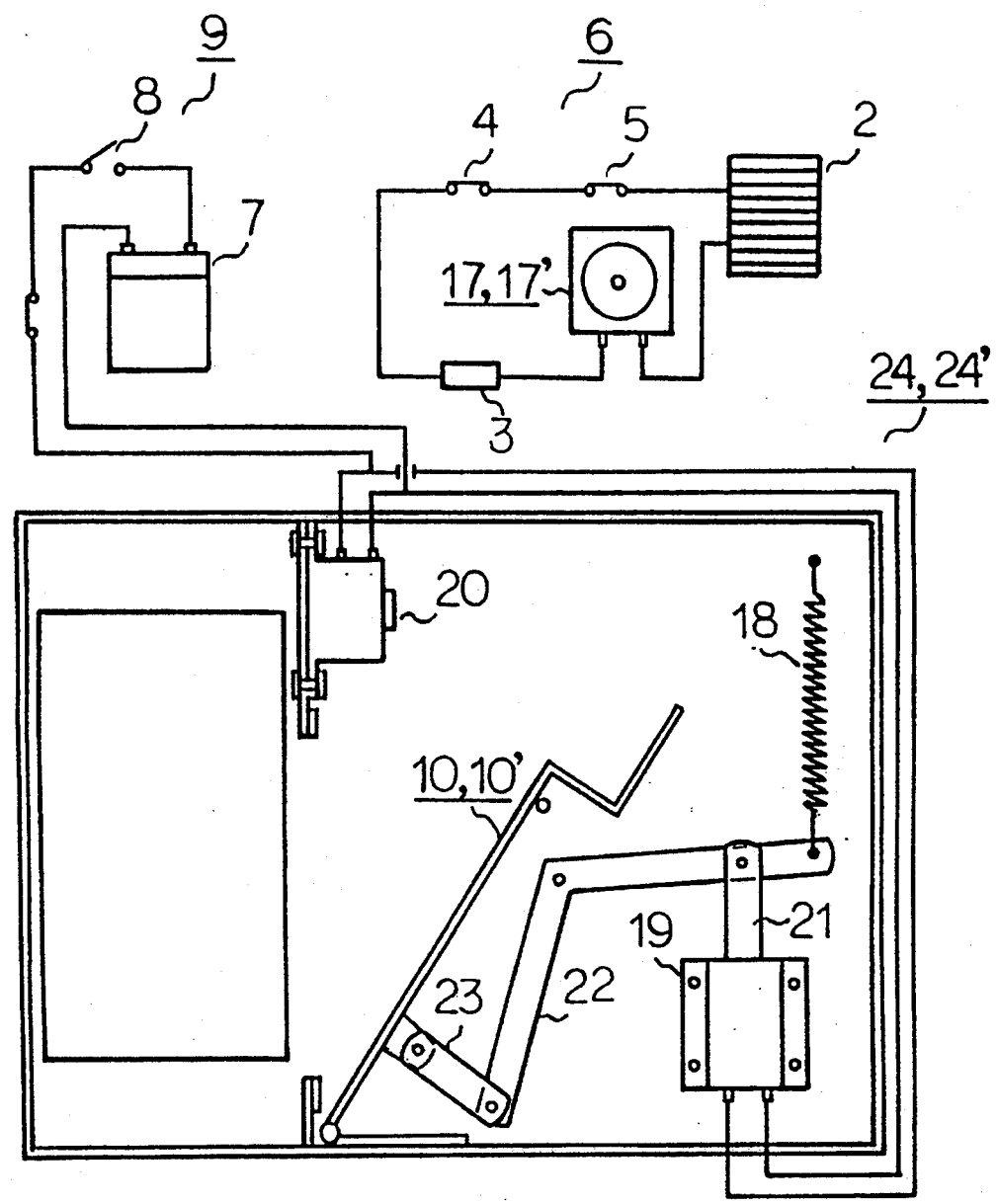
FIG. 5 is a diagrammatic view of an automatic vehicular ventilating system in a second embodiment according to the present invention provided with the air exhaust unit and the fresh air supply unit of FIG. 2, in which the air exhaust damper and the air supply damper are opened.
Figure 6:
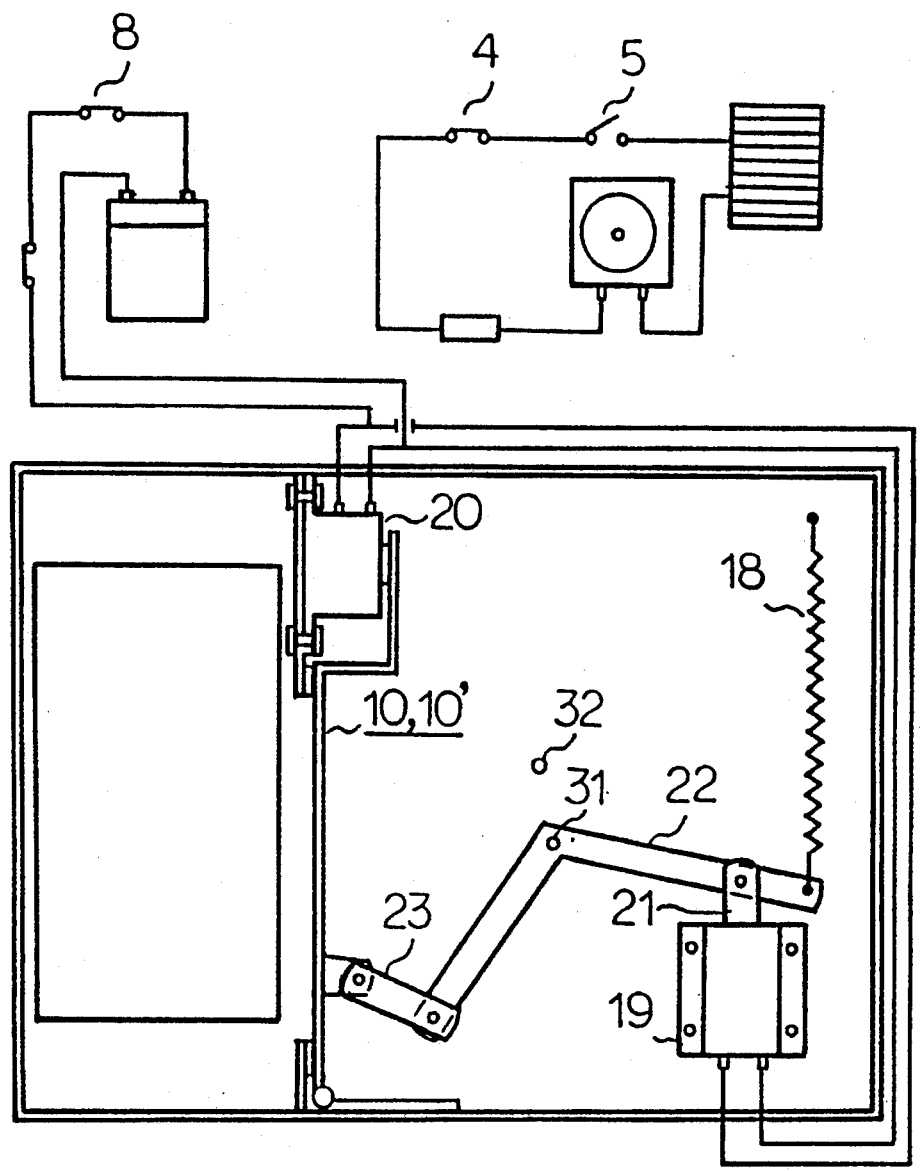
FIG. 6 is a diagrammatic view of the automatic vehicular ventilating system of FIG. 5, in which the air exhaust damper and the air supply damper are closed.

Referring to FIGS. 5 and 6, an automatic vehicular ventilating system in a second embodiment according to the present invention comprises a solar power supply unit 6, a battery power supply unit 9, an air exhaust unit 24 for discharging air outside from the passenger room of the automobile, and a fresh air supply unit 24' for supplying fresh air into the passenger room of the automobile.

The solar power supply unit 6 comprises a solar panel 2 disposed at an appropriate position on the surface of the body of the automobile, a thermostat 3 for measuring the temperature of air in the passenger room, a first switch 4 controlled by the thermostat 3, and a second switch 5 interlocked with the engine switch, not shown, or the hand brake, not shown, of the automobile so as to be closed when the engine switch is opened or the hand brake is applied. In the following description, it is supposed that the second switch 5 is interlocked with the engine switch so as to be closed when the engine switch is opened.

The battery power supply unit 9 comprises the battery 7 of the automobile, and a third switch 8 interlocked with the engine switch or the hand brake of the automobile so as to be opened when the engine switch is opened or the hand brake is applied. In the following description, it is supposed that the third switch is interlocked with the engine switch.

The air exhaust unit 24 comprises, as principal components, an air exhaust damper 10, an air exhaust device 17, a first solenoid actuator 19 for operating the air exhaust damper 10, an electromagnet 20 for holding the air exhaust damper 10 at its closed position, and a linkage interlocking the air exhaust damper 10 with the first solenoid actuator 19.

The fresh air supply unit 24' comprises, as principal components, an air supply damper 10', an air supply device 17', a first solenoid actuator 19 for operating the air supply damper 10', an electromagnet 20 for holding the air supply damper 10' at its closed position, and a linkage interlocking the air supply damper 10' with the first solenoid actuator 19.

The air exhaust device 17 and the air supply device 17' are powered by the solar panel 2 of the solar power supply unit 6, and the first solenoids 19 and the electromagnets 20 are powered by the battery 7 of the battery power supply unit 9.

The air exhaust unit 24 and the fresh air supply unit 24' are substantially the same in construction, and hence only the construction of the air exhaust unit 24 will be described and the corresponding components of the fresh air supply unit 24' will be shown in parentheses.

The linkage of the air exhaust unit 24 (the fresh air supply unit 24') comprises a first link 22 pivotally supported on the casing of the air exhaust unit 24 (the fresh air supply unit 24'), and having a first arm pivotally joined to the extremity of the plunger 21 of the first solenoid actuator 19, and a second link 23 having one end pivotally joined to the extremity of a second arm of the first link 22 and the other end pivotally joined to a bracket fixed to the air exhaust damper 10 (the air supply damper 10'). A spring 18 has one end connected to a spring peg fixed to the casing and the other end connected to the extremity of the first arm of the first link 22.

When the automobile is stopped for parking and the engine switch is opened, the third switch 8 is opened to disconnect the battery 7 from the first solenoid actuators 19 and the electromagnets 20 of the air exhaust unit 24 and the fresh air supply unit 24', the second switch 5 is closed so that the solar panel 2 can be connected to the air exhaust unit 24 and the fresh air supply unit 24 when the temperature of air in the passenger room measured by the thermostat 3 exceeds the specified temperature and, consequently, the air exhaust damper 10 and the air supply damper 10' are opened by the springs 18 to open an outlet vent and an inlet vent formed in the casings for ventilation.

When the engine switch is closed, the third switch 8 is closed to connect the battery 7 to the first solenoid actuators 19 and the electromagnets 20 of the air exhaust unit 24 and the fresh air supply unit 24', and the second switch 5 is opened to disconnect the solar power supply unit 6 from the air exhaust unit 24 and the fresh air supply unit 24'.

The operation of the automatic vehicular ventilating system in the second embodiment will be described hereinafter with reference to FIGS. 5 and 6.

When the automobile is stopped for parking and the engine switch is opened, the second switch 5 is closed and the third switch 8 is opened. Consequently, the battery power supply unit 9 is disconnected from the first solenoids 19 and the electromagnets 20, so that the air exhaust damper 10 and the air supply damper 10' are turned clockwise to the position shown, in FIG. 5, through the linkages by the springs 18 until the air exhaust damper 10 and the air supply damper 10' are stopped at their open positions by the stoppers 32. When the temperature of air in the passenger room measured by the thermostat 3 increases beyond the specified temperature while the automobile is parked, the first switch 4 is closed to connect the solar power supply unit 6 to the air exhaust device 17 and the air supply device 17' to actuate the air exhaust device 17 and the air supply device 17' for ventilation. Thus, in the second embodiment, the air exhaust damper 10 and the air supply damper 10' are opened by the springs 18, the air exhaust damper 10 and the air supply damper 10' are closed and held at their closed positions by the first solenoid actuators 19 and the electromagnets 20 driven by electric energy supplied from the battery power supply unit 9, and the air exhaust device 17 and the air supply device 17' are driven for operation by electric energy supplied from the solar power supply unit 6. In the state shown in FIG. 6, which is established only when the engine is in operation, the electric energy consumed for continuously energizing the first solenoid actuators 19 and the electromagnets 20 is compensated with electric energy generated by the generator of the automobile, so that the battery 7 will not be exhausted. Since the solar power supply unit 6 needs to supply electric energy only for driving the air exhaust device 17 and the air supply device 17', the solar panel 2 of the solar power supply unit 6 may be of a comparatively small capacity.

When the engine switch is closed to start the engine of the automobile, the second switch 5 is opened and the third switch 8 is closed. Consequently, the air exhaust device 17 and the air supply device 17' are stopped, and the battery power supply unit 9 is connected to the first solenoid actuators 19 and the electromagnets 20. Then, the plungers 21 of the first solenoid actuators 19 are retracted to turn the air exhaust damper 10 and the air supply damper 10' counterclockwise to the position shown in FIG. 6, through the linkages, and the electromagnets 20 are energized to hold the air exhaust damper 10 and the air supply damper 10' firmly at their closed position by magnetic attraction in a state shown in FIG. 6 to seal the passenger room. Accordingly, the air-conditioning effect of the air conditioner is not reduced.

Figure 1B:
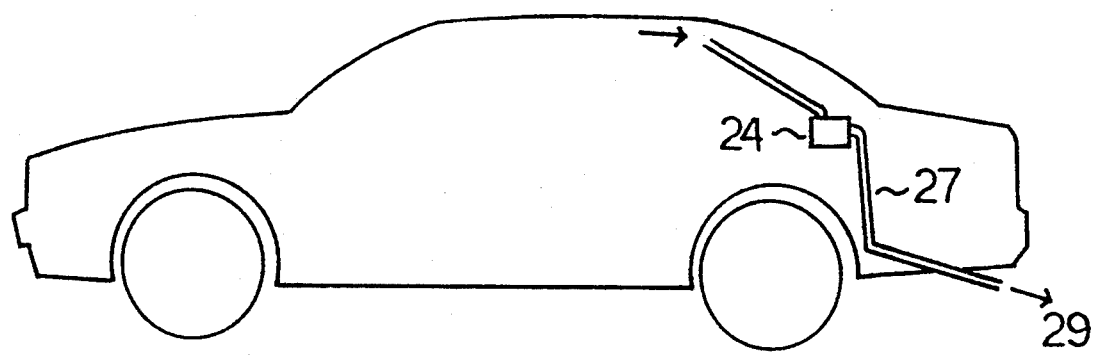
Figure 1C:
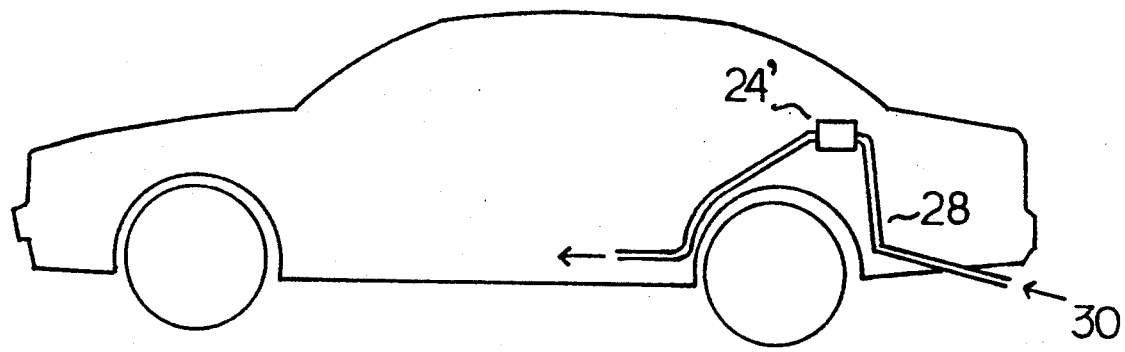

As shown in FIG. 2, a duct 26 provided with deflector plates 25 may be connected to the casing of the air exhaust unit 24 (the fresh air supply unit 24') so that the outlet vent 33 (the inlet vent 33) opens outside through the duct 26 to prevent the flow of water into the air exhaust unit 24 (the fresh air supply unit 24') on a rainy day or when washing the automobile. A return duct 27 connected to the air exhaust unit 24, and a supply duct 28 connected to the fresh air supply unit 24' may be extended in the passenger room as shown in FIGS. 1A through 1C to enhance the ventilating efficiency of the automatic vehicular ventilating system.

The arrangement of the components of the automatic vehicular ventilating system is not limited to that specifically described with reference to the foregoing embodiments. The components may be arranged at any suitable positions on the body of the automobile.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. An automatic vehicular ventilating system for ventilating a passenger room of a vehicle, comprising:

a solar power supply means including a thermostat for determining when a predetermined temperature in the passenger room is reached, a solar panel for generating power, a first switch electrically connected to the solar panel and in communication with the thermostat, said first switch being actuated to a closed condition when the thermostat determines that the predetermined temperature is exceeded, and a second switch in communication with at least one of an ignition and a hand brake of said vehicle such that the second switch is actuated to a closed condition when the ignition is off or the hand brake is on;

exhaust means electrically connected to the solar power supply means including an exhaust damper for discharging air from the passenger room to a location outside said vehicle;

fresh air supply means electrically connected to the solar power supply means including an air supply damper for supplying fresh air into the passenger room;

battery power supply means including a third switch in communication with at least one of said ignition switch and said hand brake of said vehicle such that the third switch is actuated to a closed condition when the ignition is on or the hand brake is off;

a corresponding solenoid actuator for opening each of said exhaust damper and said air supply damper;

a corresponding electrical holding device for holding each of said air exhaust damper and said supply damper closed; and a corresponding linkage for connecting each of said exhaust damper and said air supply damper with the corresponding solenoid actuator, each such corresponding linkage including a first end pivotally joined to a plunger of said corresponding solenoid actuator and a second end pivotally joined to said exhaust damper and said air supply damper, respectively, each corresponding linkage further including a spring for biasing the exhaust damper and the air supply damper closed;

wherein each solenoid actuator is driven by electric power supplied from said solar power supply means when the first switch and the second switch are actuated to the closed condition, and each holding device is driven by electric power supplied from said battery power supply means when the third switch is actuated to the closed condition.

2. An automatic vehicular ventilating system according to claim 1, wherein said exhaust means further includes an air duct provided with deflector plates connected to an air exhaust passage communicating with said passenger room; and said air supply means further includes an air duct provided with deflector plates connected to an air supply passage communicating with said passenger room.

3. An automatic vehicular ventilating system for ventilating a passenger room of a vehicle, comprising:

a solar power supply means including a thermostat for determining when a predetermined temperature in the passenger room is reached, a solar panel for generating power, a first switch electrically connected to the solar panel and in communication with the thermostat, said first switch being actuated to a closed condition when the thermostat determines that the predetermined temperature is exceeded, and a second switch in communication with at least one of an ignition and a hand brake of said vehicle such that the second switch is actuated to a closed condition when the ignition is off or the hand brake is on;

a battery power supply unit including a battery of said vehicle, and a third switch in communication with at least one of said ignition switch and said hand brake of said vehicle, such that the third switch is actuated to a closed condition when the ignition is on or the hand brake is off;

exhaust means electrically connected to the solar power supply means including an exhaust damper for discharging air from the passenger room to a location outside said vehicle;

fresh air supply means electrically connected to the solar power supply means including an air supply damper for supplying fresh air into the passenger room;

a corresponding spring for opening each of said air exhaust damper and said air supply damper;

a corresponding solenoid actuator for closing each of said exhaust damper and said air supply damper;

a corresponding electrical holding device for holding each of said exhaust damper and said air supply damper closed;

a corresponding linkage for connecting each of said exhaust damper and said air supply damper to said corresponding spring and said corresponding solenoid actuator, each such corresponding linkage including a first end pivotally joined to a plunger of said corresponding solenoid actuator and a second end pivotally joined to said exhaust damper and said air supply damper, respectively;

said exhaust means and said air supply means being driven by electric power supplied from said solar power supply means when the first switch and the second switch are actuated to the closed condition; and said corresponding solenoid actuators and said corresponding holding devices being driven by electric power supplied from said battery power supply means when the third switch is actuated to the closed condition.

4. An automatic vehicular ventilating system according to claim 3, wherein said exhaust means further includes an air duct provided with deflector plates connected to an air exhaust passage communicating with said passenger room; and said air supply means further includes an air duct provided with deflector plates connected to an air supply passage communicating with said passenger room.

5. An automatic vehicular ventilating system for ventilating a passenger room of a vehicle, comprising:

a solar power supply means including a thermostat for determining when a predetermined temperature in the passenger room is reached, a solar panel for generating power, a first switch electrically connected to the solar panel and in communication with the thermostat, said first switch being actuated to a closed condition when the thermostat determines that the predetermined temperature is exceeded, and a second switch in communication with at least one of an ignition and a hand brake of said vehicle such that the second switch is actuated to a closed condition when the ignition is off or the hand brake is on;

exhaust means electrically connected to the solar power supply means including an exhaust damper for discharging air from the passenger room to a location outside said vehicle;

fresh air supply means electrically connected to the solar power supply means including an air supply damper for supplying fresh air into the passenger room;

battery power supply means including a third switch in communication with at least one of said ignition switch and said hand brake of said vehicle such that the third switch is actuated to a closed condition when the ignition is on or the hand brake is off; and a corresponding electrical holding device for holding each of said air exhaust damper and said supply damper closed;

wherein said exhaust means and said air supply means are operated by electric power supplied from said solar power supply means when the first switch and the second switch are actuated to the closed condition, and each holding device is driven by electric power supplied from said battery power supply means when the third switch is actuated to the closed condition.

6. An automatic vehicular ventilating system according to claim 5, wherein said exhaust means further includes an air duct provided with deflector plates connected to an air exhaust passage communicating with said passenger room; and said air supply means further includes an air duct provided with deflector plates connected to an air supply passage communicating with said passenger room.

* * * * *